Patented Mar. 23, 1926.

1,577,797

UNITED STATES PATENT OFFICE.

WALTER FLEMMING, OF BRESLAU, GERMANY.

PROCESS OF MANUFACTURING AROMATICALLY-DISUBSTITUTED THIOUREAS OF SYMMETRIC CONSTITUTION.

No Drawing. Application filed March 19, 1925. Serial No. 16,836.

*To all whom it may concern:*

Be it known that I, WALTER FLEMMING, a citizen of the German Republic, and a resident of Breslau, Germany, have invented a new and useful Improved Process of Manufacturing Aromatically-Disubstituted Thioureas of Symmetric Constitution, of which the following is a specification.

The processes of manufacturing aromatically disubstituted thio-ureas of symmetric constitution has practiced up to now are deficient in various respects. They require the provision of a specially devised apparatus (boiling-vessel with return-conduit), a solvent for the aromatic amine (in most cases alcohol), a supply of heat, and a comparatively long duration of the respective process. All these drawbacks and disadvantages are obviated practically completely (except a few cases in which heat cannot be dispensed with) by and in my present improved process which is carried through as follows:

If carbon disulphide and an aqueous solution of strong bases are caused to act, in a closed vessel and by shaking, upon an aromatic amine, spontaneous heating will take place after a short time, and the reaction will be finished a few minutes thereafter. The product, viz, the correspondingly disubstituted thio-urea, is, with most amines, obtained in a very good yield if the proportion of the quantities of the starting substances is chosen according to the formula.

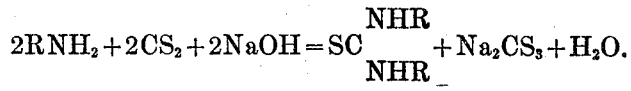

In the foregoing formula R indicates the phenyl-group or other aromatic atomgroups, for instance tolyl- or xylyl-groups.

A slight excess of one of the component substances does no harm; it is, in fact, favorable for the yield if that substance is a base.

The reaction proceeds probably as follows:

In the first place the amine forms, together with one molecule $CS_2$ and one molecule of the respective base, for instance NaOH, the salt of the corresponding dithiocarbamide acid, for instance

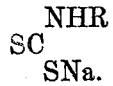

These compounds, however, are very unstable and tend to decompose due to a reversal of the reaction, if R is an aromatic radical. But if another molecule $CS_2$ and another molecule of the respective base is present, for instance NaOH, the unstable carbamidic salt reacts in another way, in that its SNa-group, together with the $CS_2$ and the NaOH, forms trithiocarbonate of sodium which, in fact, is obtained by this process as a byproduct and in a good yield. There is to be seen probably in this formation of trithiocarbonate the fall of energy which accelerates the otherwise by far more slowly proceeding reaction.

In order to give an example I am going to describe in the following lines the production of sulpho-carbanilide from aniline: 100 grams of aniline are mixed in a thick-walled bottle with a solution of 50 grams of caustic soda in 150 grams of water, whereafter 82 grams of carbon disulphide are added. Now the bottle is tightly stoppered and shaken vigorously. After some minutes the contents of the bottle become hot spontaneously, and within 8 to 10 minutes the reaction is finished. The sulpho-carbanilide precipitates and is filtered off after the liquid has cooled down, whereafter it is washed, first with water and then with diluted muriatic acid. The intensely red filtrate contains the trithiocarbonate formed. The output of sulphocarbanilide amounts to from 105 to 110 grams. The product is pure white and of a high degree of purity.

The course of the reaction is expressed by the following equation:

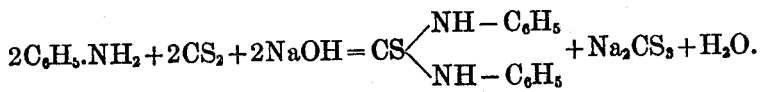

I claim:

1. The process of manufacturing aromatically disubstituted thio-ureas of symmetric constitution consisting in causing the amine to enter into a reaction with such amounts of aqueous solution of caustic alkali and of carbon disulphide that the formation of thio-ureas and trithiocarbonate can take place simultaneously; the proportion of the said ingredients being such, that for each molecule of amine one molecule of caustic alkali and one molecule of carbon disulphide is employed.

2. The process of manufacturing aromatically disubstituted thio-ureas of symmetric constitution consisting in causing the amine to enter into a reaction within a closed vessel with such amounts of aqueous solution of caustic alkali and of carbon disulphide that the formation of thio-ureas and trithiocarbonate can take place simultaneously; the proportion of the said ingredients being such, that for each molecule of amine one molecule of caustic alkali and one molecule of carbon disulphide is employed.

3. The process of manufacturing aromatically disubstituted thio-ureas of symmetric constitution consisting in causing the amine to enter into a reaction with such amounts of aqueous solution of caustic alkali and of carbon disulphide that the formation of thio-ureas and trithiocarbonate can take place simultaneously and using, while the reaction proceeds, the heat of reaction for the transformation; the proportion of the said ingredients being such, that for each molecule of amine one molecule of caustic alkali and one molecule of carbon disulphide is employed.

4. The process of manufacturing aromatically disubstituted thio-ureas of symmetric constitution as main product and of a highly concentrated solution of the thio-ureas as a byproduct, consisting in causing the amine to enter into a reaction with such amounts of aqueous solution of caustic alkali and of carbon disulphide that the formation of thio-ureas and trithiocarbonate can take place simultaneously; the proportion of the said ingredients being such, that for each molecule of amine one molecule of caustic alkali and one molecule of carbon disulphide is employed.

5. The process of manufacturing aromatically disubstituted thio-ureas of symmetric constitution, consisting in causing the amine employed without any solvent to enter into a reaction with such amounts of aqueous solution of caustic alkali and of carbon disulphide that the formation of thio-ureas and trithiocarbonate can take place simultaneously; the proportion of the said ingredients being such, that for each molecule of amine one molecule of caustic alkali and one molecule of carbon disulphide is employed.

In testimony whereof I affix my signature.

Dr. WALTER FLEMMING.